(12) United States Patent
Hochmuth et al.

(10) Patent No.: US 6,509,905 B2
(45) Date of Patent: *Jan. 21, 2003

(54) METHOD AND APPARATUS FOR PERFORMING A PERSPECTIVE PROJECTION IN A GRAPHICS DEVICE OF A COMPUTER GRAPHICS DISPLAY SYSTEM

(75) Inventors: Roland M. Hochmuth, Fort Collins, CO (US); Samuel C. Sands, Loveland, CO (US); Larry J. Thayer, Fort Collins, CO (US); Gayani N. K. Gamage, Broomfield, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,754

(22) Filed: Nov. 12, 1998

(65) Prior Publication Data

US 2001/0045958 A1 Nov. 29, 2001

(51) Int. Cl.[7] .................................................. G09G 5/00
(52) U.S. Cl. ....................................................... 345/619
(58) Field of Search ................................ 345/619, 620, 345/426, 506, 501–503, 519–520, 522, 643–645, 621

(56) References Cited

U.S. PATENT DOCUMENTS

| | | | | |
|---|---|---|---|---|
| 5,734,808 A | * | 3/1998 | Takeda | 345/434 |
| 5,812,136 A | * | 9/1998 | Keondjian | 345/419 |
| 6,052,129 A | * | 4/2000 | Fowler et al. | 345/434 |
| 6,097,395 A | * | 8/2000 | Harris et al. | 345/426 |

OTHER PUBLICATIONS

Foley et al "Computer Graphics: Principles and Practice" Second edition, pp. 856–874, 1993.*

Foley et al "Computer Graphics: Principles and Practice" Second edition, pp. 866–874, 1993.*

* cited by examiner

Primary Examiner—Thu Nguyen

(57) ABSTRACT

A method and apparatus for processing primitives in a computer graphics display system. The apparatus comprises a graphics device which receives commands and data from a host computer of the computer graphics display system. The data includes clip coordinates which are perspective projected by the graphics device into window coordinates. The host computer of the computer graphics display system is programmed to execute a geometry processing pipeline which transforms object coordinates associated with a primitive into clip coordinates which are then delivered to the graphics device. The graphics device then performs perspective projection on the clip coordinates to transform the clip coordinates into window coordinates.

12 Claims, 4 Drawing Sheets

METHOD AND APPARATUS FOR PERFORMING A PERSPECTIVE PROJECTION IN A GRAPHICS DEVICE OF A COMPUTER GRAPHICS DISPLAY SYSTEM

TECHNICAL FIELD OF THE INVENTION

The present invention relates to a method and apparatus for processing primitives in a computer graphics display system. More particularly, the present invention relates to a computer graphics display system operating in accordance with the window coordinate architectural model in which perspective projection is performed in the graphics hardware of the computer graphics display system rather than in the host central processing unit (CPU).

BACKGROUND OF THE INVENTION

Generally, two architectural models are currently used in the three-dimensional (3-D) computer graphics industry to send graphics primitives to the graphics hardware. One of the architectural models, commonly referred to as the object coordinate, or modeling coordinate, architectural model (hereinafter "the object coordinate model") is implemented in computer graphics display systems that are geometry accelerated. In this architectural model, the vertex object coordinates of an application, as well as any optional data, such as normals and colors, are sent directly to the graphics device (e.g., a graphics card) from the host CPU and are completely transformed by the geometry accelerator of the graphics device from object coordinates into device/window coordinates and, optionally, into eye/world coordinates. The geometry accelerator is also responsible for performing perspective projection during the transformation process, as well as for performing additional operations, such as lighting and fog calculations, for example.

The second architectural model is commonly referred to as the window coordinate architectural model (hereinafter "the window coordinate model"). In typical implementations of this architectural model, the vertex object coordinates associated with an application being executed by the host CPU are transformed by a software geometry processing pipeline being executed in the host CPU into window coordinates. The vertex object coordinates are first transformed into eye coordinates, which are then transformed into clip coordinates. Assuming that perspective projection is needed (i.e., assuming that the image being rendered is 3-D) the clip coordinates are then perspective projected into normalized device coordinates. The normalized device coordinates are then transformed into window coordinates. All of these transformations occur within the host CPU.

Once the host CPU has transformed the vertex object coordinates into window coordinates, and has completed any additional processing tasks, such as the tasks of performing lighting and clipping, the window coordinates and any optional vertex data are sent to the graphics hardware. The graphics hardware then performs vector and triangle setup and scan conversion. A known variation of this approach is to also perform vector and/or triangle setup in the host CPU so that the graphics hardware is only required to perform scan conversion.

In the window coordinate model, it is common, in the non-perspective case, for the clip coordinates to correspond directly to the window coordinates. In this case, the system CPU does not have to perform the tasks of perspective projecting the clip coordinates into normalized device coordinates and then of transforming the normalized device coordinates into window coordinates. However, in the perspective case, the clip coordinates must be perspective projected into normalized device coordinates and then the normalized device coordinates must be transformed into window coordinates, which are additional processing steps that typically involve a divide operation and several multiply operations. These are costly processing steps, particularly the perspective division operation, which must be performed by the host CPU prior to sending the window coordinates to the graphics hardware.

In another known implementation of the window coordinate model, the vertex object coordinates are transformed directly into window clip coordinates which are then perspective projected into window coordinates. Although this approach improves the computational efficiency of the transformation pipeline being executed by the host CPU, these transformations still require a significant amount of processing to be performed in the host CPU.

Some computer graphics display systems which implement the window coordinate model comprise graphics hardware which implements a floating-point cell which comprises a general-purpose divider circuit. This divider circuit is used in some of these systems to perform the tasks of vector and triangle setup. It would be advantageous to use this floating-point cell to perform perspective projection in addition to performing vector and triangle setup. However, current implementations of 3-D graphics application program interfaces (APIs), such as, for example, OpenGL™ designed by Silicon Graphics, Inc. and Direct3D™ designed by Microsoft Corporation, used in window coordinate models for performing transformation in the host CPU present window coordinates to the graphics hardware.

Therefore, the current implementations of these types of graphics APIs, among which OpenGL™ and Direct3D™ are currently the most widely used, do not enable the task of perspective projection to be performed within the graphics hardware, but rather, cause these transformation processes to be performed in the host CPU. Consequently, graphics devices currently available on the market are not adapted to perform the task of perspective projection since this task has historically been performed in the host CPU.

A need exists for a computer graphics display system which operates in accordance with the window coordinate architectural model and which allows the task of perspective projection to be performed in the graphics hardware. It would be particularly advantageous to enable the task of perspective projection to be performed in the above-mentioned floating-point cell currently implemented in the graphics hardware of computer graphics display systems currently available on the market. By off-loading the task of perspective projection from the host CPU to the graphics hardware, increased throughput can be realized and processing overhead can be reduced.

SUMMARY OF THE INVENTION

The present invention provides a method and apparatus for processing primitives in a computer graphics display system. The apparatus comprises a graphics device which receives commands and data from a host computer. The data includes clip coordinates which are perspective projected by the graphics device into window coordinates. A host computer of the computer graphics display system is programmed to execute a geometry processing pipeline which transforms object coordinates associated with a primitive into clip coordinates which are then delivered to the graphics device. The graphics device then performs perspective projection on the clip coordinates to transform the clip coordinates into window coordinates.

In accordance with the preferred embodiment of the present invention, the geometry processing pipeline being executed by the host computer transforms the object coordinates into window clip coordinates and then delivers the window clip coordinates to the graphics device. The graphics device then performs perspective projection on the window clip coordinates to transform them into window coordinates. In accordance with an alternative embodiment of the present invention, the geometry processing pipeline being executed in the host computer transforms the object coordinates into eye coordinates and then transforms the eye coordinates into clip coordinates. The clip coordinates are then delivered to the graphics device, which transforms the clip coordinates into window coordinates.

In accordance with the preferred embodiment of the present invention, the graphics device comprises an interface unit and a setup unit. The setup unit is in communication with the interface unit. The setup unit receives commands and data sent by the host computer to the interface unit and the interface unit delivers the clip coordinates to the setup unit. The setup unit comprises a floating point unit which performs perspective projection on the clip coordinates or window clip coordinates to transform them into window coordinates.

The setup unit preferably comprises a control register which contains a plurality of bits which are used by the floating point unit to control its operations. One of the bits is a perspective enable bit which is utilized by the floating point unit to inform the floating point unit as to whether or not perspective projection is to be performed by the floating point unit. In accordance with the preferred embodiment, if the perspective enable bit is asserted, the floating point unit performs perspective projection, and if the perspective enable bit is not asserted, the floating point unit does not perform perspective projection on the clip coordinates.

In some cases, perspective projection may be performed in the host computer. In this case, the host computer will deliver window coordinates to the graphics device and it will be unnecessary for the graphics device to perform perspective projection. Therefore, in this case, the perspective enable bit will not be asserted. In some cases, even though, in accordance with the present invention, the graphics device is configured to perform perspective projection, it may be unnecessary to perform perspective projection at all. In this case, the perspective enable bit will not be asserted. Regardless of whether or not perspective projection is performed, the setup unit will also perform vector and triangle setup, which are operations normally performed by setup units in graphics devices of computer graphics display systems.

Other features and advantages of the present invention will become apparent from the following description, drawings and claims.

DETAILED DESCRIPTION OF THE INVENTION

Figure 1:
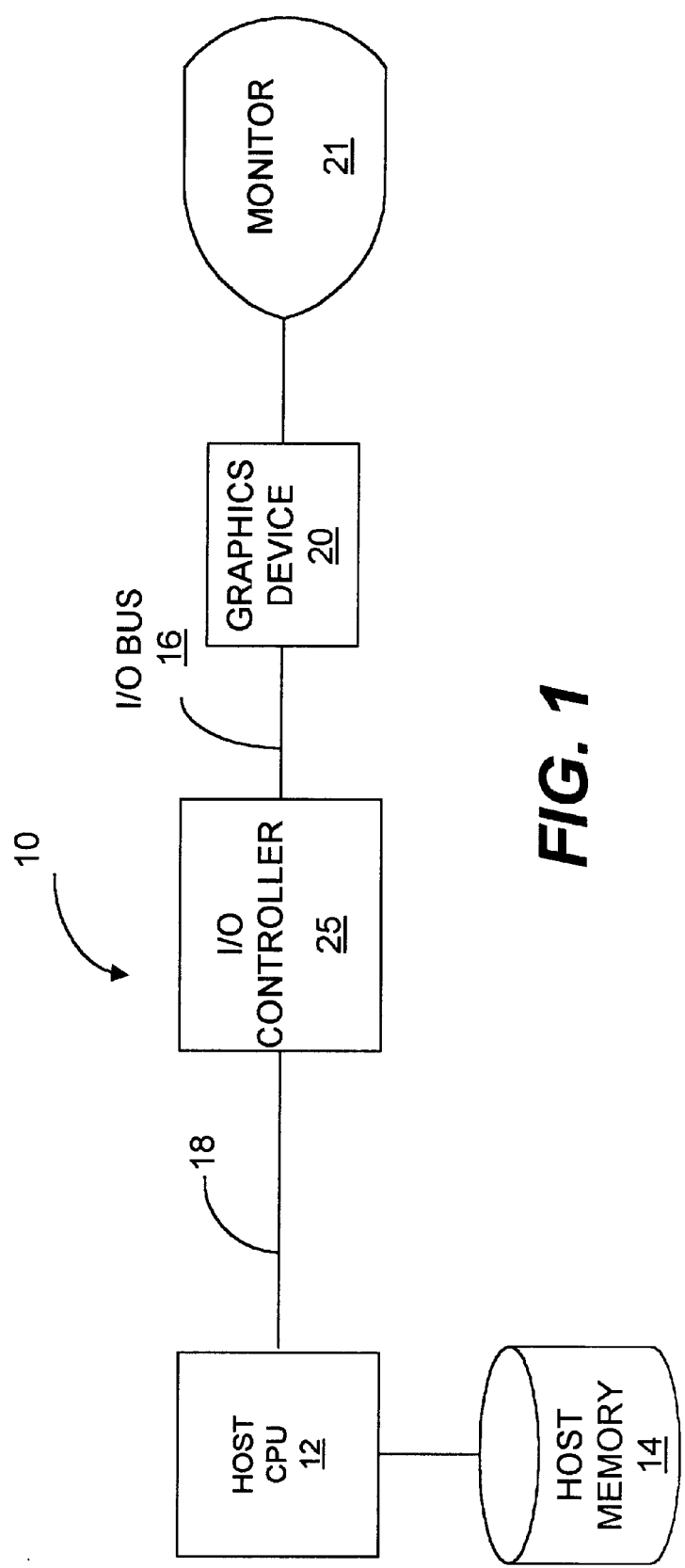
FIG. 1 is a block diagram of a typical computer graphics display system that operates in accordance with the window coordinate architectural model.

FIG. 1 is a block diagram of a typical computer graphics display system 10 that operates in accordance with the window coordinate architectural model. The computer graphics display system 10 comprises a host CPU 12, a host memory device 14, a local bus 18, an input/output (I/O) controller device 25, an I/O bus 16, a graphics device 20, and a monitor 21 for displaying graphics information output from the graphics device 20.

The host CPU 12 executes application programs and outputs commands and data over the local bus 18 to the I/O interface controller 25. The I/O interface controller 25 formats the commands and data utilizing the protocols of the I/O bus 16 and this information is then input to the graphics device 20. The graphics device 20 then processes this information and causes graphics images to be displayed on the monitor 21.

As stated above, in the window coordinate model, the host CPU 12 normally performs the entire process of transforming vertex object coordinates into clip coordinates and, when perspective projection is required, of transforming the clip coordinates into normalized device coordinates and of transforming the normalized device coordinates into window coordinates. Once the host CPU 12 has performed these transformations, and has completed any additional processing tasks, such as the tasks of performing lighting and clipping, the window coordinates and any optional vertex data are sent to the graphics device 20 via the I/O controller 25. The graphics device 20 then performs the process of rasterization. In accordance with the present invention, the task of perspective projection is not performed by the host CPU 12, but rather, is performed by the graphics device 20, as discussed below in detail.

Figure 2:
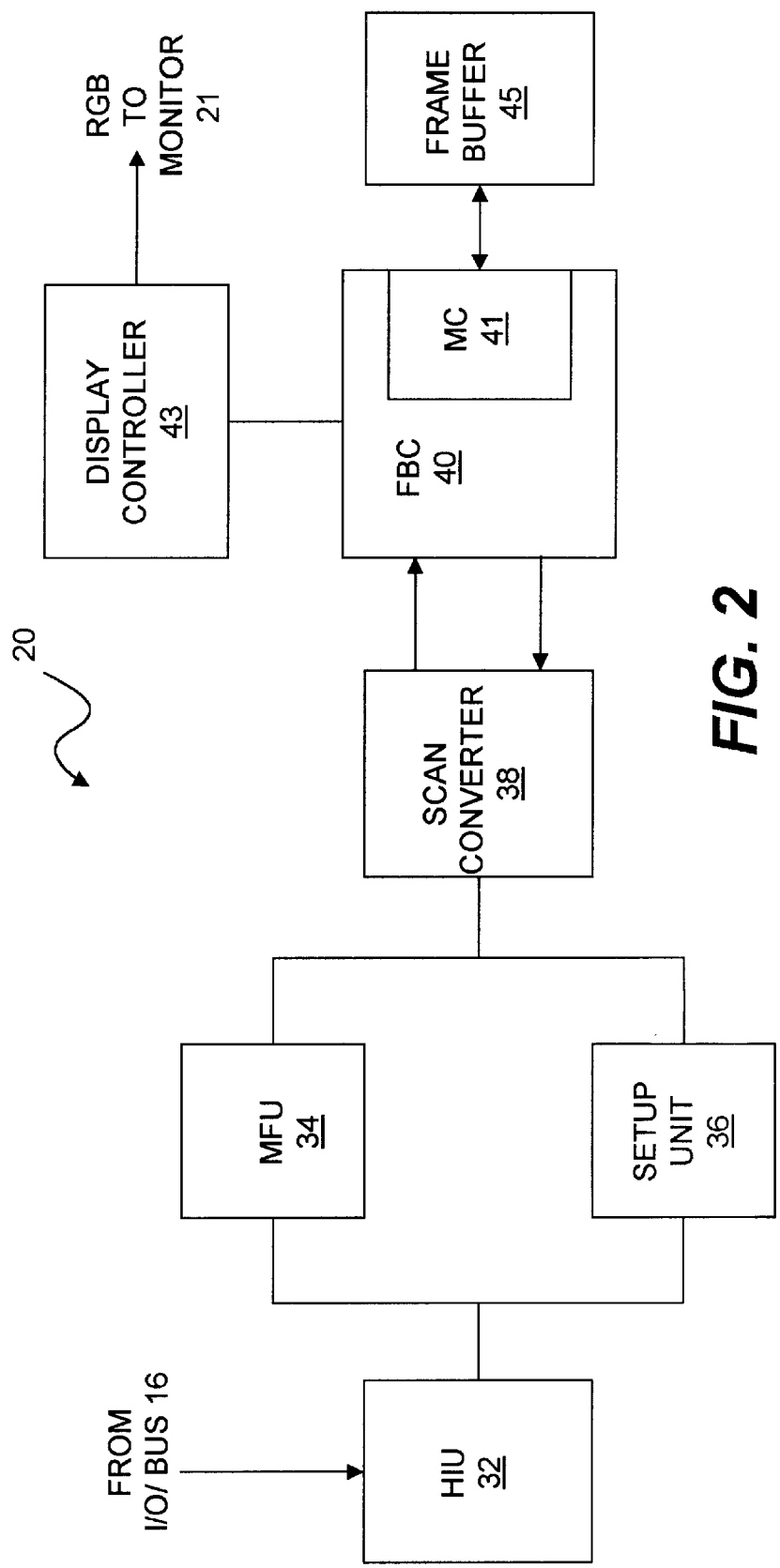
FIG. 2 is a block diagram of the graphics device of the computer graphics display system shown in FIG. 1 in accordance with the preferred embodiment of the present invention.

FIG. 2 is a block diagram of the graphics device 20 of the present invention in accordance with the preferred embodiment. The host interface unit (HIU) 32, the macro-function unit (MFU) 34, the scan converter 38, the frame buffer controller (FBC) 40 and the display controller 43 are typical components in graphics display systems. Therefore, only a cursory explanation of the functions of these components will be provided herein since persons skilled in the art will understand the operations that are performed by these components. In accordance with the present invention, the setup unit 36 of the graphics device 20 performs perspective projection. The setup unit 36 is discussed below in detail.

The host interface unit 32 fetches command data packets and texture maps from the host memory 14 via the I/O bus 16. The host interface unit 32 then provides graphics 2D information to the macro-function unit 34 and provides primitives to be perspective projected and/or to be transformed by parallel transformation to the setup unit 36. The macro-function unit 34 generates 2D vectors, text and rectangle spans. The output from the macro-function unit 34 is received by the scan converter 38. The scan converter 38 then converts this information into pixel-level information which is output to the frame buffer controller 40. The frame buffer controller 40 stores the pixel-level information in the frame buffer memory 45 via the memory controller 41. The frame buffer controller 40 causes the pixel-level image information to be read out of the frame buffer memory 45 by the memory controller 41 and output to the display controller 43. The display controller 43 then converts this information into red, green and blue (RGB) format and displays the corresponding image on the display 21.

As stated above, in accordance with the present invention, the host CPU 12 executes a software graphics transformation pipeline to transform the vertex object coordinates of an application being executed by the host CPU 12 into clip coordinates and performs any additional processing, such as, for example, lighting and clipping. The clip coordinates and any optional vertex data are then sent to the graphics device 20. A description of a typical software graphics transformation pipeline executed in a CPU will now be provided since the host CPU 12 of the present invention executes such a software transformation pipeline up to the point at which the task of perspective projection is to be performed. The task of perspective projection is then performed by the graphics device 20. In accordance with the present invention, any type of graphics API such as, for example, OpenGL™ or Direct3D™, may be used in accordance with the present invention to perform the transformations which precede perspective projection in the host CPU 12. Those skilled in the art will understand that the present invention is not limited with respect to the graphics API that is be used to create the software geometry processing pipeline which performs the transformations in the host CPU 12.

Software geometry processing pipelines designed using a graphics API, such as, for example, OpenGL™, are divided into a sequence of stages. Each stage utilizes a matrix which is multiplied by data to transform the data. These matrices are the Model-View Matrix, the Projection Matrix and the Viewport Transformation Matrix. The operations of each of these stages will now be discussed with respect to the flow chart of FIG. 3. In the first stage, the vertex object coordinates, which are termed object coordinates in the OpenGL™ Graphics System, are supplied by the application using the OpenGL™ graphics API, as indicated by block 51. The Model-View Matrix is then applied to these coordinates to yield eye coordinates, as indicated by block 52. The Projection Matrix is then applied to the eye coordinates to yield clip coordinates, as indicated by block 54. A perspective division is then carried out on the clip coordinates to yield normalized device coordinates, as indicated by block 56. A final viewport transformation is applied to the normalized device coordinates utilizing the Viewport Transformation Matrix to convert these coordinates into window coordinates, as indicated by block 58.

The equations used to perform the steps discussed above with respect to FIG. 3 will now be discussed in order to demonstrate the manner in which the various coordinate sets are transformed. Object coordinate sets, eye coordinate sets, and clip coordinate sets are four dimensional coordinate sets. Each set consists of x, y, z and w coordinates which define a vertex of a primitive being processed. The w coordinate contains the perspective information. Thus, the Model-View and Projection matrices are 4×4 matrices. Given a vertex defined in object coordinates as (x0, y0, z0, w0) and a Model-View matrix defined as M, the eye coordinates of the vertex are obtained from the following equation:

$$(xe, ye, ze, we) = M(x0, y0, z0, w0) \quad \text{Equation (1)}$$

where (xe, ye, ze, we) are the eye coordinates. Similarly, given a Projection Matrix defined as P, the clip coordinates of the vertex are obtained from the following equation:

$$(xc, yc, zc, wc) = P(xe, ye, ze, we) \quad \text{Equation (2)}$$

where (xc, yc, zc, wc) are the clip coordinates. The normalized device coordinates of the vertex are then obtained from the following equation by perspective division:

$$(xd, yd, zd) = (xc/wc, yc/wc, zc/wc) \quad \text{Equation (3)}$$

Finally, the normalized device coordinates are mapped into window coordinates using the Viewport Transformation Matrix. The dimensions of the Viewport Transformation Matrix depend on the pixel height and width, py and px, respectively, of the viewport and on the coordinates defining its center (ox, oy). The window coordinates of the vertex, (xw, yw, zw), are then determined from the following equation:

$$(xw, yw, zw) = ((px/2)xd + ox, (py/2)yd + oy, ((f-n)/2)zd + (n+f)/2) \quad \text{Equation (4)}$$

The variables n and f correspond to the near and far z ranges of the primitive, respectively.

Figure 4:
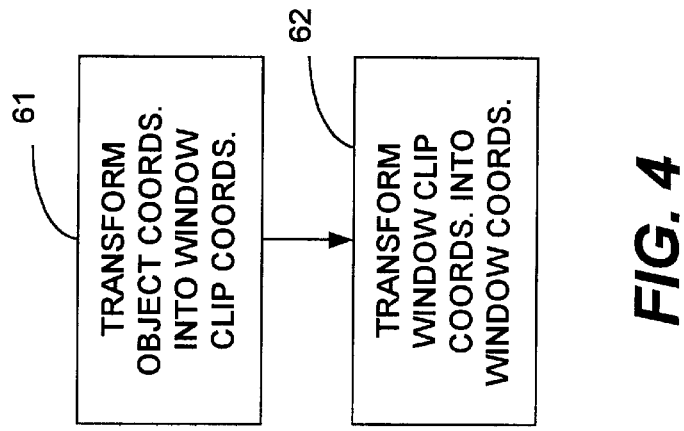
FIG. 4 is a flow chart functionally illustrating a second process of transforming object coordinates associated with a primitive into window coordinates.

Often, for computational efficiency, the Model-View Matrix, the Projection Matrix, and the Viewport Transformation Matrix are concatenated together into a single matrix, C, as demonstrated by the flow chart of FIG. 4. In this case, the object coordinates are transformed into window clip coordinates, as indicated by block 61. This transformation is accomplished using a single matrix transformation in accordance with the following equation:

$$(xc, yc, zc, wc) = C(x0, y0, z0, w0) \quad \text{Equation (5)}$$

The window clip coordinates are then perspective projected into window coordinates by performing perspective division, as indicated by block 62. This transformation is accomplished using the following equation:

$$(xw, yw, zw) = (xc/wc, yc/wc, zc/wc) \quad \text{Equation (6)}$$

Figure 3:
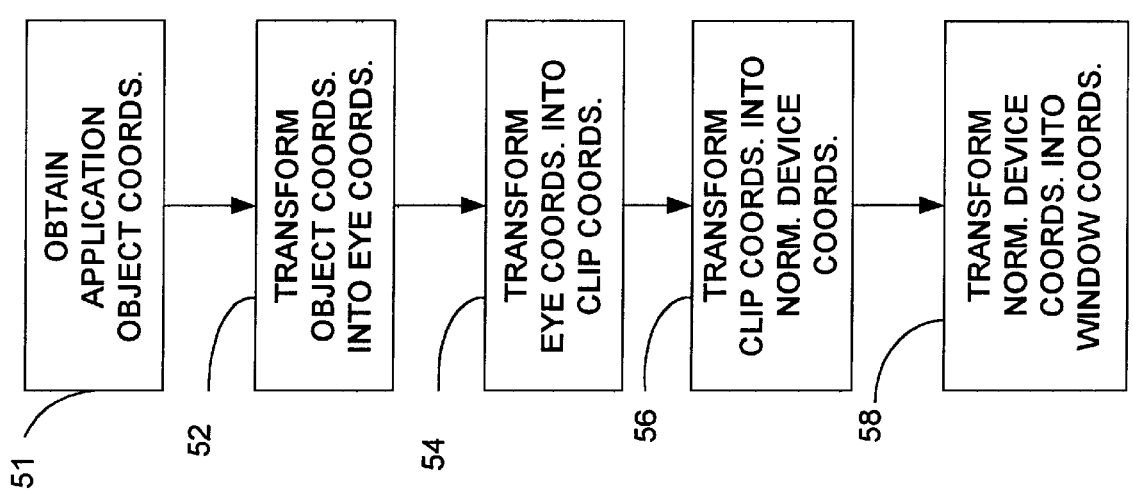
FIG. 3 is a flow chart functionally illustrating a first process of transforming object coordinates associated with a primitive into window coordinates.

In computer graphics display systems which utilize the window coordinate model, the task of perspective projection, i.e., of transforming the clip coordinates or window clip coordinates into window coordinates, is typically performed in the host CPU 12 before the window coordinates are sent to the graphics device for subsequent rasterization. In accordance with a first embodiment of the present invention, the clip coordinates obtained from the process corresponding to equations (1), (2) and (4), i.e., to steps 52 and 54 in FIG. 3, are sent directly to the graphics device 20. The graphics device 20 then performs the task of perspective projection, which corresponds to equations (3) and (4), i.e., to steps 56 and 58 in FIG. 3, to transform the clip coordinates into window coordinates in the setup unit 36.

In accordance with the preferred embodiment of the present invention, the window clip coordinates obtained from the process corresponding to equation (5), i.e., to step 61 in FIG. 4, are sent directly to the graphics device 20. The setup unit 36 of the graphics device then performs the task of perspective projection, which corresponds to equation (6), i.e., to block 62 in FIG. 4.

Therefore, by utilizing the setup unit 36 in accordance with the present invention to perform the task of perspective projection, a considerable amount of computation is offloaded from the host CPU 12 to the graphics device 20.

Preferably, the setup unit 36 comprises a floating-point unit of the type typically utilized in geometry-accelerated graphics devices for performing vector and triangle setup. Graphics devices currently available on the market which contain such a floating point unit include, for example, HP Visualize fx 2™, HP Visualize fx 4™ and HP Visualize fx 6™. This floating point unit comprises a general purpose divider that is normally used to perform vector and triangle setup. However, it will be understood by those skilled in the art that the present invention does not require the use of one of these floating point units and that any floating point unit which comprises a divider circuit capable of transforming clip or window clip coordinates into window coordinates is suitable for this purpose. Also, persons skilled in the art will understand that it is not necessary to use a floating point unit for this purpose. Any divider circuit capable of performing these operations is suitable for use with the present invention.

Preferably, the task of perspective projection is performed in the setup unit 36 prior to the task of vector and triangle setup being performed. Once the clip coordinates have been transformed into window coordinates and vector and triangle setup has been performed, scan conversion and rasterization is performed by the scan converter 38 and by the frame buffer controller 40. Since the scan conversion and rasterization processes are typical processes performed in graphics devices, these processes will not be further discussed herein since those skilled in the art will understand the manner in which these processes are performed.

Figure 5:
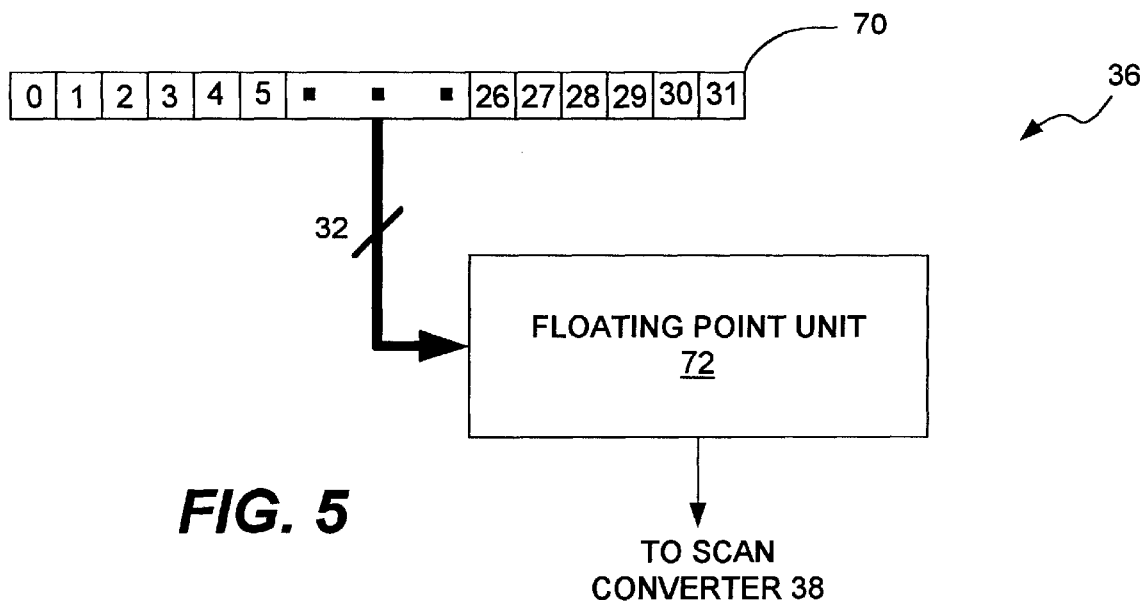
FIG. 5 is a functional block diagram of the setup unit shown in FIG. 2 in accordance with the preferred embodiment of the present invention.

As shown in FIG. 5, the setup unit 36 preferably comprises a control register 70 which is utilized by the floating point unit 72 to determine whether perspective projection is to be performed by the floating point unit 72. The floating point unit 72 preferably is a microcode engine which utilizes and which is controlled by the values of bits stored in the control register 70. Other devices, such as, for example, a state machine, an application specific integrated circuit (ASICs), etc., or any other type of computational device capable of performing the functions of the microcode engine, can be used instead of the microcode engine for performing the functions performed by the microcode engine, as will be understood by those skilled in the art.

In accordance with the preferred embodiment of the present invention, a single bit contained in the control register 70, hereinafter referred to as the perspective enable bit, indicates whether the floating point unit 72 is to perform perspective projection on the received primitive. The host CPU 12 causes the control register 70 to be updated by the host interface unit 32. Thus, the perspective enable bit is asserted or de-asserted by the host CPU 12. Preferably, when the perspective enable bit is asserted, the floating point unit 72 performs perspective projection on the received primitive. When the perspective enable bit is not asserted, the floating point unit 72 does not perform perspective projection, but rather, performs vector and triangle setup and outputs the results to the scan converter 38. Thus, the floating point unit 72 is programmable to allow perspective projection to be performed in the host CPU 12 or in the setup unit 36.

There are several advantages to allowing the computer graphics display system 10 to perform perspective projection in the host CPU 12 or in the graphics device 20. If the graphics API being executed on host CPU 12 has been implemented to provide window coordinates to the graphics device 20, then the floating point unit 72 should not perform perspective projection because it has already been performed by the host CPU 12. In this case, the perspective enable bit will not be asserted. In some cases, the user supplies the vertex object coordinates and the w coordinate may be 1, which means that perspective projection is not to be performed (i.e., perspective division by 1 is the same as no division). In this case, the host CPU 12 will cause the perspective enable bit to be de-asserted. In some cases, it may be possible that performing perspective projection in the CPU 12 is faster than performing perspective projection in the graphics device. In this case, the perspective enable bit will be set to 0 by the host CPU 12 so that the floating point unit does not perform perspective projection.

Figure 6:
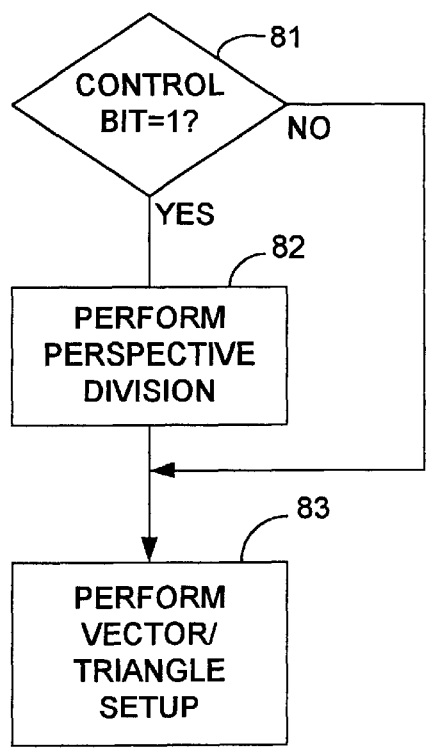
FIG. 6 is a flow chart functionally illustrating the process performed by the floating point unit shown in FIG. 5 to determine whether perspective projection is to be performed by the floating point unit.

FIG. 6 is a flow chart functionally illustrating the process occurring in the setup unit 36 when it is processing a primitive received in the setup unit 36. When a primitive is received, the floating point unit 72 determines whether the perspective enable bit is equal to 1, as indicated by block 81. If so, perspective projection is to be performed. Therefore, the process proceeds to the step represented by block 82 at which perspective division is performed. Once perspective division has been performed at block 82, the process proceeds to block 83 where vector and triangle setup operations are performed.

If the floating point unit 72 determines that the perspective enable bit is 0, thus indicating that perspective projection is not to be performed, the process bypasses the step represented by block 82 and proceeds to the step represented by block 83 where vector and triangle setup operations are performed.

The host CPU 12 determines whether perspective projection is to be performed by the setup unit 36 or by the host CPU 12 and asserts or de-asserts the perspective enable bit accordingly. The host CPU 12 can determine whether perspective projection is to be performed by either analyzing the w coordinate of the vertex object coordinate set associated with a primitive, or by looking at the values of the Model View and Projection matrices associated with a primitive. Both of these techniques are commonly used in window coordinate architectural models in order for the host CPU to determine whether or not it is to perform perspective projection. Therefore, in the interest of brevity, a detailed discussion of the manner in which host CPU 12 performs this task will not be provided herein.

It should be noted that a plurality of bits instead of a single bit may be used, if so desired, to indicate whether or not perspective projection is to be performed in the setup unit 36, although preferably only a single bit is used for this purpose, as discussed above in detail. Also, although the perspective enable bit has been referred to as having a value of 1 when it is asserted, a value of 0 could be used instead to indicate that the perspective enable bit is asserted, as will be understood by those skilled in the art.

It will be understood by those skilled in the art that the present invention has been described with respect to the preferred embodiments of the present invention, but that the present invention is not limited to these embodiments. Those skilled in the art will understand that modifications can be made to the embodiments discussed above which are within the spirit and scope of the present invention.

What is claimed is:

1. An apparatus for processing primitives in a computer graphics display system, the apparatus comprising:
   a graphics device, the graphics device comprising an interface unit for receiving commands and data froze a host computer, the data including clip coordinates generated by an algorithm being executed by the host computer, the graphics device comprising logic configured to perform perspective projection on the clip coordinates to transform the clip coordinates into window coordinates;

said logic is comprised by a setup unit, the setup unit being in communication with the interface unlit, the setup unit receiving commands and data sent by the host computer to the interface unit, the interface unit deliver the clip coordinates to the setup unit, wherein the setup unit comprises a floating point unit, wherein the floating point unit comprised in the setup unit performs perspective projection on the clip coordinates to transform the clip coordinates into window coordinates; and said setup unit further comprises a control register, the control register containing a plurality of bits used by the floating point unit to control the operations of the floating point unit, wherein a perspective enable bit contained in the control register is utilized by the floating point unit to inform the floating point unit as to whether or not the floating point unit is to perform perspective projection on the clip coordinates received by the setup unit, wherein if the perspective enable bit is asserted, the floating point unit performs perspective projection on the clip coordinates and wherein if the perspective enable bit is not asserted, the floating point unit does not perform perspective projection on the clip coordinates.

2. The apparatus of claim 1, wherein if the perspective enable bit is asserted, the setup unit performs perspective projection on the clip coordinates to transform the clip coordinates into window coordinates and then performs vector and triangle setup, wherein the setup unit utilizes the window coordinates to perform vector and triangle setup.

3. The apparatus of claim 2, wherein the clip coordinates are window clip coordinates and wherein, if the perspective enable bit is asserted, the floating point unit performs perspective projection on the window clip coordinates to transform the window clip coordinates into window coordinates, and wherein the setup unit performs vector and triangle setup on the window coordinates.

4. A computer graphics display system for processing primitives and for rendering an image on a display device of the compute graphics display system, the computer graphics display system comprising:

a host computer, the host computer being programmed to execute a geometry processing pipeline program, the geometry processing pipeline program receiving object coordinates relating to a primitive being processed in the computer graphics display system, the geometry processing pipeline transforming the object coordinates into clip coordinates;

a graphics device in communication with the host computer, the graphics device receiving the clip coordinates generated by the host computer and performing perspective projection on the clip coordinates to transform the clip coordinates into window coordinates; and said graphics device comprises an interface unit for receiving the clip coordinates from the host computer and a setup unit in communication with the interface unit for receiving the clip coordinates from the interface unit, the setup unit comprising a control register and a floating point unit, the control register comprising a plurality of bits utilized by the floating point unfit to control the operations of the floating point unit, said control register containing a perspective enable bit, the perspective enable bit being utilized by the floating point unit to determine whether or not perspective projection is to be performed in the setup unit, wherein if th perspective enable bit is asserted, the floating point unit performs perspective projection on the clip coordinates to transform the clip coordinates into window coordinates.

5. The computer graphics display system of claim 4, wherein the geometry processing pipeline program being executed in the host computer transforms the object coordinates into clip coordinates by first transforming the object coordinates into eye coordinates and then by transforming the eye coordinates into clip coordinates, and wherein the graphics device performs perspective projection by transforming the clip coordinates into normalized device coordinates and then by transforming the normalized device coordinates into window coordinates.

6. The computer graphics display system of claim 4, wherein the clip coordinates received by the interface unit of the graphics device are window clip coordinates, wherein the geometry processing pipeline program being executed in the host computer transforms the object coordinates into window clip coordinates and wherein the interface unit delivers the window clip coordinates to the setup unit, and wherein when the perspective enable bit is asserted, the floating point unit performs perspective projection on the window clip coordinates to transform the window clip coordinates into window coordinates.

7. A method for performing perspective projection in a computer graphics display system, the method comprising the steps of:

receiving clip coordinates in a graphics device, the clip coordinates being sent to the graphics device by a host computer of tee computer graphics display system, the host computer executing an algorithm that generates the clip coordinates; and performing perspective projection on the clip coordinates i the graphics device to transform the clip coordinates into window coordinates;

said graphics device comprises an interface unit and a setup unit, the setup unit comprising a floating point unit, wherein the interface unit receives the clip coordinates sent from the host computer and delivers the clip coordinates to the setup unit, wherein the floating point unit of the setup unit performs perspective projection on the clip coordinates to transform the clip coordinates into window coordinates; and said setup unit comprises a control register, the control register containing a plurality of bits used by the floating point unit to control the operations of the floating point unit, wherein a perspective enable bit contained in the control register is utilized by the floating point unit to inform the floating point unit as to whether or not the floating point unit is to perform perspective projection on the clip coordinates received by the setup unit, wherein if the perspective enable bit is asserted, the floating point unit performs perspective projection on the clip coordinates and wherein if the perspective enable bit is not asserted, the floating point unit does not perform perspective projection on the clip coordinates.

8. The method of claim 7, wherein if the perspective enable bit is asserted, the setup unit performs perspective projection on the clip coordinates to transform the clip coordinates into window coordinates and then performs vector and triangle setup, wherein the setup unit utilizes the window coordinates to perform vector and triangle setup.

9. The method of claim 8, wherein the clip coordinates are window clip coordinates and wherein, if the perspective enable bit is asserted, the floating point unit performs perspective projection on the window clip coordinates to transform the window clip coordinates into window coordinates, and wherein the setup unit performs vector and triangle setup on the window coordinates.

10. A method for performing perspective projection in computer graphics display system, the method comprising the steps of:

transforming the object coordinates into clip coordinates in a host computer of the computer graphics display system, Se host computer executing a geometry processing pipeline program which transforms the object coordinates into clip coordinates;

receiving the clip coordinates in a graphics device in communication with the host computer, the graphics device performing perspective projection on the clip coordinates to transform the clip coordinates into window coordinates; and said graphics device comprises an interface unit for receiving the clip coordinates from the host computer and a setup unit in communication with the interface unit for receiving the clip coordinates from the interface unit, the setup unit comprising a control register and a floating point unit, the control register comprising a plurality of bits utilized by the floating point unit to control the operations of the floating point unit, said control register containing a perspective enable bit, wherein the floating point unit utilizes the perspective enable bit to determine whether or not perspective projection is to be performed in the setup unit, wherein if the perspective enable bit is asserted the floating point unit performs perspective projection on the clip coordinates to transform the clip coordinates into window coordinates.

11. The method of claim 10, wherein the geometry processing pipeline program being executed in the host computer transforms the object coordinates into clip coordinates by first transforming the object coordinates into eye coordinates and by transforming the eye coordinates into clip coordinates, and wherein the graphics device performs perspective projection by transforming the clip coordinates into normalized device coordinates and then by transforming the normalized device coordinates into window coordinates.

12. The method of claim 10, wherein the clip coordinates received by the graphics device are window clip coordinates, and wherein the geometry processing pipeline program being executed in the host computer transforms the object coordinates into window clip coordinates, and wherein the interface unit receives the window clip coordinates and delivers the window clip coordinates to the setup unit, and wherein when the perspective enable bit is asserted, the floating point unit performs perspective projection on the window clip coordinates to transform the window clip coordinates into window coordinates.

* * * * *

UNITED STATES PATENT AND TRADEMARK OFFICE
CERTIFICATE OF CORRECTION

PATENT NO.    : 6,509,905 B2
DATED         : January 21, 2003
INVENTOR(S)   : Roland M. Hochmuth et al.

It is certified that error appears in the above-identified patent and that said Letters Patent is hereby corrected as shown below:

Column 9,
Line 2, delete "unlit" and insert therefor -- unit --

Column 12,
Line 1, after "asserted" insert -- , --

Signed and Sealed this

First Day of February, 2005

JON W. DUDAS
*Director of the United States Patent and Trademark Office*